United States Patent
Liu et al.

(10) Patent No.: US 10,148,403 B2
(45) Date of Patent: Dec. 4, 2018

(54) METHODS AND APPARATUSES FOR RECEIVING AND SENDING CONTROL CHANNEL

(71) Applicant: Huawei Technologies Co., Ltd., Shenzhen (CN)

(72) Inventors: Kunpeng Liu, Beijing (CN); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1 day.

(21) Appl. No.: 15/245,974

(22) Filed: Aug. 24, 2016

(65) Prior Publication Data

US 2016/0365960 A1 Dec. 15, 2016

Related U.S. Application Data

(63) Continuation of application No. 14/166,506, filed on Jan. 28, 2014, now Pat. No. 9,455,812, which is a (Continued)

(30) Foreign Application Priority Data

Jul. 28, 2011 (CN) .......................... 2011 1 0213895

(51) Int. Cl.
*H04L 5/00* (2006.01)
*H04W 72/12* (2009.01)
(Continued)

(52) U.S. Cl.
CPC .......... *H04L 5/0053* (2013.01); *H04L 1/0046* (2013.01); *H04W 48/12* (2013.01); *H04W 72/1268* (2013.01); *H04W 72/1273* (2013.01)

(58) Field of Classification Search
CPC .... H04L 5/0053; H04L 1/0046; H04W 48/12; H04W 72/1268; H04W 72/1273
See application file for complete search history.

(56) References Cited

U.S. PATENT DOCUMENTS 8,520,621 B2 8/2013 Tee et al.
2010/0208666 A1 8/2010 Frederiksen et al.
(Continued)

FOREIGN PATENT DOCUMENTS

CN 101809898 A 8/2010
CN 101827444 A 9/2010
(Continued)

OTHER PUBLICATIONS

"3rd Generation Partnership Project; Technical Specification Group Radio Access Network; Evolved Universal Terrestrial Radio Access (E-UTRA); Physical layer procedures (Release 10)," 3GPP TS 36.213, Version 10.2.0, 3rd Generation Partnership Project, Valbonne, France (Jun. 2011).

(Continued)

*Primary Examiner* — Chandrahas B Patel
(74) *Attorney, Agent, or Firm* — Leydig, Voit & Mayer, Ltd.

(57) ABSTRACT

Embodiments of the present invention disclose methods and apparatuses for receiving and sending a control channel, and are applicable to the field of communications technologies. In the embodiments of the present invention, a base station carries scheduling information of a user equipment of an R11 system in both the PDCCH region and the E-PDCCH region of a downlink subframe. In this way, the user equipment needs to detect the control channel within the PDCCH region and the E-PDCCH region, so that resources of the two regions are available to the user equipment of the R11 system. Moreover, the user equipment detects only the control channel of the first type in the PDCCH region, and detects control channels of the other type in the E-PDCCH region. The method in the embodiments of the present invention does not increase the number of control channel detections.

21 Claims, 4 Drawing Sheets

Related U.S. Application Data continuation of application No. PCT/CN2012/079316, filed on Jul. 28, 2012.

(51) Int. Cl.
*H04W 48/12* (2009.01)
*H04L 1/00* (2006.01)

(56) References Cited

U.S. PATENT DOCUMENTS

| | | | |
|---|---|---|---|
| 2013/0028134 | A1 | 1/2013 | Wang et al. |
| 2014/0204887 | A1 | 7/2014 | Chung et al. |

FOREIGN PATENT DOCUMENTS

| | | | |
|---|---|---|---|
| CN | 102395206 A | | 3/2012 |
| RU | 2298888 C2 | | 5/2007 |
| WO | WO 09093955 A2 | | 11/2003 |
| WO | WO 2010053984 A2 | | 5/2010 |
| WO | WO 2010124544 A1 | | 11/2010 |
| WO | WO 2010126852 A1 | | 11/2010 |
| WO | WO 2011085192 A1 | | 7/2011 |

OTHER PUBLICATIONS

"On enhanced downlink control signaling for Rel-11," 3GPP TSG RAN WG1 Meeting #65, Barcelona, Spain, R1-1117 43, 3rd Generation Partnership Project, Valbonne, France (May 9-13, 2011).

"3rd Generation Partnership Project; Technical Specification Group Radio Access Network; Evolved Universal Terrestrial Radio Access (U-UTRA); Physical layer procedures (Release 10)," 3GPP Ts 36.213, Version 10.0.0, 3rd Generation Partnership Project, Valbonne, France (Dec. 2010).

"Control channel design for the support of wider bandwidth for L TE-Advanced," slides for presentation, TSG-RAN1 #56, Athens, Greece, R1-090759, 3rd Generation Partnership Project, Valbonne, France (Feb. 9-13, 2009).

"Considerations on the ePDCCH design," 3GPP TSG RAN WG1 Meeting #67, San Francisco, USA, R 1-113655, 3rd Generation Partnership Project, Valbonne, France (Nov. 14-18, 2011).

"Investigation on downlink control channel and signaling enhancements," 3GPP TSG RAN WG1 meeting #65, Barcelona, Spain, R1-111253, 3rd Generation Partnership Project, Valbonne, France (May 9-13, 2011).

"Search Space Definition: Reduced PDCCH Blind Detection for Split PDCCH Search Space," 3GPP TSG RAN1#50bis, Shanghai, China, R1-073996, 3rd Generation Partnership Project, Valbonne, France (Oct. 8-12, 2007).

"Configuration on aperiodic SRS," 3GPP TSG RAN WG1, Meeting #63, Jacksonville, Florida, R1-105849, 3rd Generation Partnership Project, Valbonne, France (Nov. 15-19, 2010).

METHODS AND APPARATUSES FOR RECEIVING AND SENDING CONTROL CHANNEL

CROSS-REFERENCE TO RELATED APPLICATIONS

This application is a continuation of U.S. patent application Ser. No. 14/166,506, filed on Jan. 28, 2014, which is a continuation of International Application No. PCT/CN2012/079316, filed on Jul. 28, 2012, which claims priority to Chinese Patent Application No. 201110213895.3, filed on Jul. 28, 2011. The afore-mentioned patent applications are hereby incorporated by reference in their entireties.

TECHNICAL FIELD

Embodiments of the present invention relates to the field of communications technologies, and in particular, to methods and apparatuses for receiving and sending a control channel.

BACKGROUND

In an existing Long Term Evolution (LTE) communication system, a base station needs to send user equipment scheduling information by using a downlink subframe. The time-frequency resources of the downlink subframe are divided into two regions: a physical downlink control channel (PDCCH) region and a physical downlink shared channel (PDSCH) region. The PDCCH region is used to transmit downlink or uplink data transmission scheduling indication signaling sent by a base station to a user equipment, including information related to data channel resource allocation, a modulation and coding scheme, and a multi-antenna transmission or hybrid automatic repeat request (HARD) process; and the PDSCH region is used to carry specific scheduling data.

Figure 1:
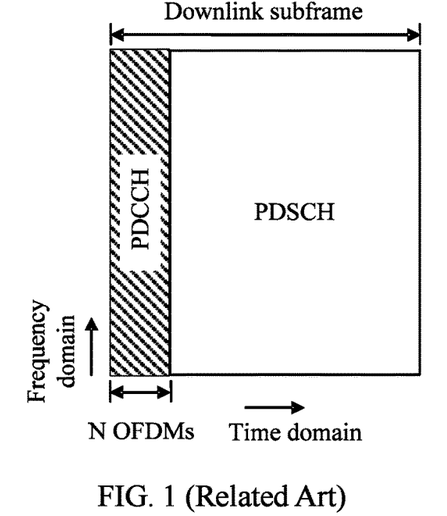
FIG. 1 is a schematic structural diagram of a downlink subframe in the prior art.

As shown in FIG. 1, in a downlink subframe, a PDSCH region and a PDCCH region employ a time division multiplexing mode. The PDCCH region (that is, the part filled with slashes in FIG. 1) occupies the first N orthogonal frequency division multiplexing (OFDM) symbols of the downlink subframe, where N is dynamically variable and less than or equal to 3, and the PDSCH region occupies the remaining OFDM symbols.

Scheduling information sent by a base station for multiple user equipments may be multiplexed in the PDCCH region in a subframe. The PDCCH region corresponding to each user equipment may be composed of 1 or 2 or 4 or 8 control channel elements (CCE). Such compositions correspond respectively to different coding rates. In this way, in the PDCCH region of the downlink subframe, CCEs make up the PDCCH region of different user equipments to carry the user equipment scheduling information sent by the base station. When receiving a downlink subframe sent by the base station, a user equipment does not know which CCEs make up a PDCCH region corresponding to the user equipment. Therefore, the user equipment needs to detect the corresponding PDCCH region blindly in a common search space and a specific search space. Specifically, the user equipment detects control channels of all possible CCE combinations (that is, 1 CCE, 2 CCEs, 4 CCEs, and 8 CCEs) in the received downlink subframe until the PDCCH region corresponding to the user equipment is detected.

To provide higher spectrum efficiency and cell edge user performance, in an evolved release (R) system of an LTE system, that is, in an R11 system, coordinated multi-point (CoMP) and a more flexible multiple-input multiple-output (MIMO) scheduling mechanism are introduced so that a cell can serve much more user equipments concurrently. Therefore, in a downlink subframe sent by the base station, a PDCCH region with at most three OFDM symbols cannot meet requirements of the R11 system, and a new PDCCH resource needs to be defined, that is, an extended physical downlink control channel (E-PDCCH) region, which uses a part of time-frequency resources of the original PDSCH region and can be multiplexed with the PDSCH region through frequency division multiplexing or time-frequency division multiplexing.

To avoid increase of blind detection of control channels by a user equipment, an existing solution is to limit uplink and downlink scheduling information of a user equipment of the R11 system to be transmitted by a base station only within an E-PDCCH region, so that the user equipment needs only to perform blind detection of the E-PDCCH region in a common search space and a specific search space. However, in a non-evolved release (R8/9/10) system of the LTE system, if the quantity of user equipments is small, the PDCCH region is not fully occupied, but the remaining PDCCH region resources are not available to the user equipments in the R11 system, which leads to low resource utilization.

SUMMARY

Embodiments of the present invention provide methods and apparatuses for receiving and sending a control channel to increase the resource utilization without increasing the number of control channel detections.

An embodiment of the present invention provides a method for receiving a control channel, including:
detecting a control channel of a first type within a physical downlink control channel PDCCH region; and
detecting a control channel of a second type within an evolved physical downlink control channel E-PDCCH region, where the control channel of the first type is different from the control channel of the second type.

An embodiment of the present invention provides a method for sending a control channel, including:
sending scheduling information over a control channel of a first type within a physical downlink control channel PDCCH region; and
sending scheduling information over a control channel of a second type within an evolved physical downlink control channel E-PDCCH region, where
the control channel of the first type is different from the control channel of the second type.

An embodiment of the present invention further provides a user equipment, including:
a first detecting unit, configured to detect a control channel of a first type within a physical downlink control channel PDCCH region; and
a second detecting unit, configured to detect a control channel of a second type within an evolved physical downlink control channel E-PDCCH region, where the control channel of the first type is different from the control channel of the second type.

An embodiment of the present invention further provides a base station, including:
a first sending unit, configured to send scheduling information over a control channel of a first type within a physical downlink control channel PDCCH region; and a second sending unit, configured to send scheduling information over a control channel of a second type within an evolved physical downlink control channel E-PDCCH region, where the control channel of the first type is different from the control channel of the second type.

As can be seen, in the embodiments of the present invention, the base station carries scheduling information of a user equipment in an R11 system in both the PDCCH region and the E-PDCCH region of a downlink subframe. In this way, the user equipment needs to detect the control channel within the corresponding PDCCH region and E-PDCCH region, so that resources of the two regions are available to the user equipment in the R11 system. Moreover, in the embodiments of the present invention, control channels of different types are detected in the PDCCH region and the E-PDCCH region, and therefore, only the control channel of the first type is detected in the PDCCH region, and a control channel of another type in a certain format is detected in the E-PDCCH region. In this way, compared with the fact that in the system of a non-evolved release, the user equipment needs to detect control channels of all possible types, the method in the embodiments of the present invention does not increase the number of control channel detections.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 2:
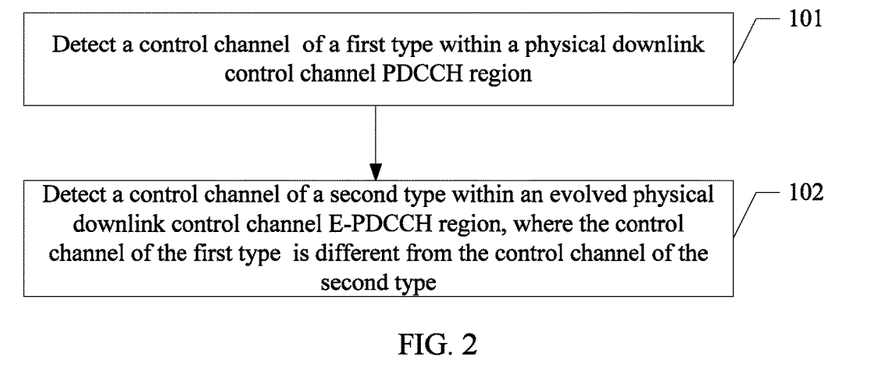
FIG. 2 is a flowchart of a method for receiving a control channel according to an embodiment of the present invention.

An embodiment of the present invention provides a method for receiving a control channel, applied to blind detection performed by a user equipment for the control channel in a process of receiving the control channel. The method in this embodiment is performed by a user equipment in an R11 system. As shown in FIG. 2, the method includes the following steps:

Step 101: Detect a control channel of a first type within a physical downlink control channel (PDCCH) region.

Step 102: Detect a control channel of a second type within an evolved physical downlink control channel (E-PDCCH) region.

Figure 3A:
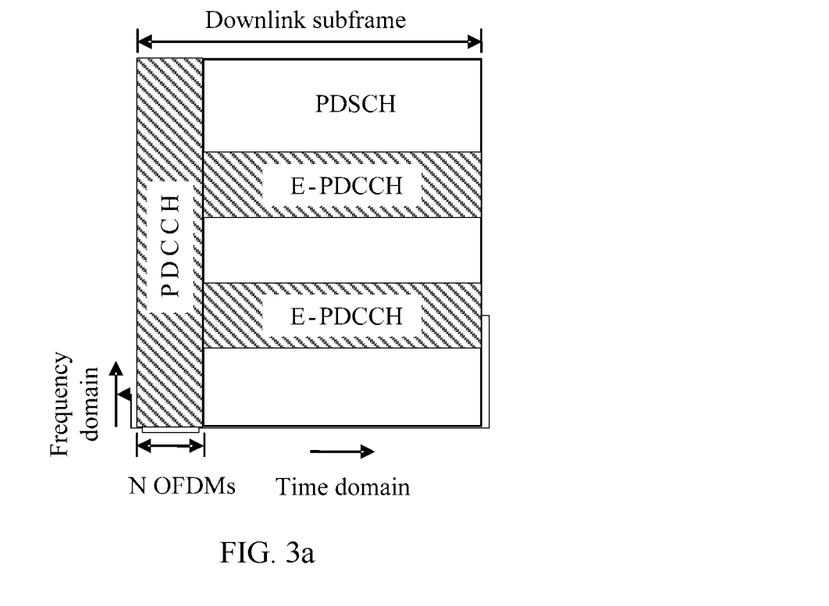
FIG. 3a is a schematic structural diagram of a downlink subframe according to an embodiment of the present invention.
Figure 3B:
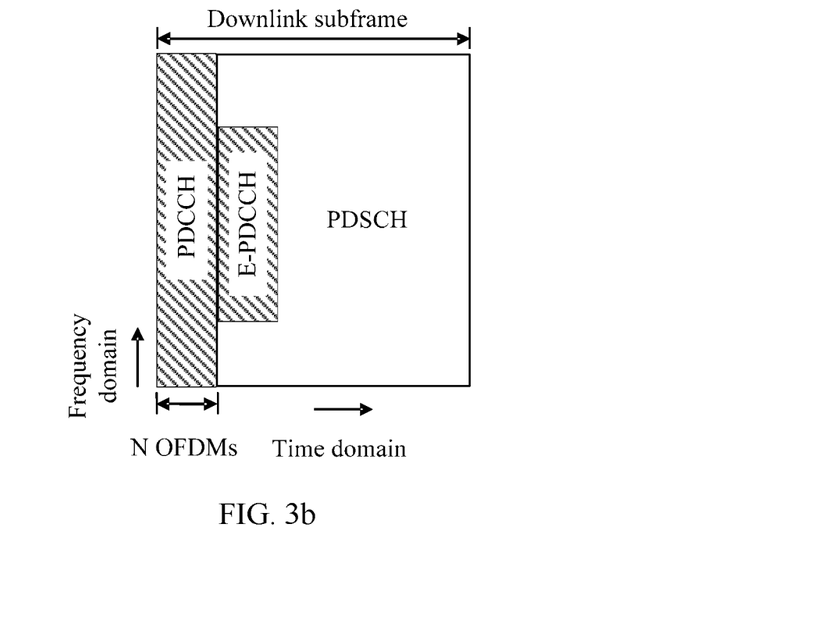
FIG. 3b is a schematic structural diagram of another downlink subframe according to an embodiment of the present invention.

Understandably, a base station may carry uplink or downlink data transmission scheduling information of a user equipment in a downlink subframe and send it to the user equipment. In the embodiment of the present invention, the downlink subframe sent by the base station includes a PDCCH region, a PDSCH region, and an E-PDCCH region. The PDSCH region and the PDCCH region employ a time division multiplexing mode, the PDCCH region occupies the first N OFDM symbols of the downlink subframe, and the PDSCH region occupies the remaining OFDM symbols. The E-PDCCH region uses a part of time-frequency resources of the original PDSCH region, and can be multiplexed with the PDSCH region through frequency division multiplexing (as shown in FIG. 3a), or multiplexed with the PDSCH region through time-frequency division multiplexing (as shown in FIG. 3b).

Figure 4:
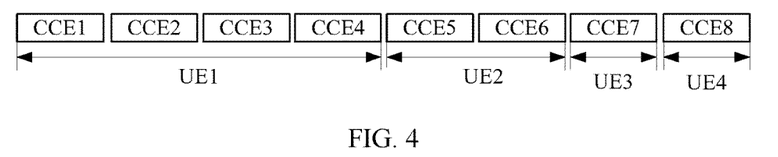
FIG. 4 is a structural diagram of multiplexing scheduling information sent by a base station for multiple user equipments into a PDCCH region of a downlink subframe according to an embodiment of the present invention.

A basic composition unit of resources in a PDCCH region is CCE. Each CCE is mapped to a group of specific time-frequency lattices (Resource Element, RE) in the PDCCH region. The scheduling information sent by the base station for multiple user equipments may be multiplexed in the PDCCH region in a downlink subframe, and the PDCCH region corresponding to each user equipment may be composed of 1 or 2 or 4 or 8 CCEs. For example, as shown in FIG. 4, CCE 1 to CCE 4 make up a PDCCH region corresponding to user equipment (UE) 1, CCE 5 and CCE 6 make up a PDCCH region corresponding to user equipment (UE) 2, and CCE 7 and CCE 8 respectively make up a PDCCH region corresponding to user equipment 3 and a PDCCH region corresponding to user equipment 4.

A basic composition unit of resources in an E-PDCCH region is evolved CCE (E-CCE). Each E-CCE is mapped to a group of specific time-frequency lattices in the E-PDCCH region. The structure and the size of the E-CCE may be the same as or different from the structure and the size of the CCE in the PDCCH region.

The base station carries user equipment scheduling information in the PDCCH region and the E-PDCCH region of the downlink subframe by using control channels of different types. For example, the base station uses a combination of N1 CCEs in the PDCCH region, and uses a combination of N2 E-CCEs in the E-PDCCH region, to transmit scheduling indication signaling of downlink or uplink data transmission scheduled by the base station for a specific user equipment. However, the user equipment does not know which control channel elements make up the PDCCH region and the E-PDCCH region that correspond to the user equipment, and therefore, when receiving the downlink subframe, the user equipment needs to blindly detect the PDCCH region and the E-PDCCH region that correspond to the user equipment. Therefore, when the user equipment performs the blind detection, the detected control channel of the first type is different from the detected control channel of the second type. Specifically, at least one of multiple attributes varies between the control channel of the first type and the control channel of the second type. The multiple attributes include: an aggregation format of the control channel, a format of signaling transmitted over the control channel, a search space type of the control channel, and so on.

Figure 5:
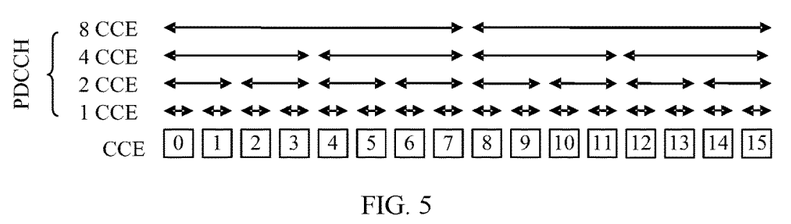
FIG. 5 is a structural diagram of an aggregation format of a PDCCH region in a downlink subframe according to an embodiment of the present invention.

(1) The aggregation format of the control channel is a tree-structured combination mode of control channel elements. Specifically, as shown in FIG. 5, the control channel elements are numbered, and the PDCCH region is composed of continuously numbered control channel elements. The number of control channel elements composition (that is, level) represents the aggregation format of the control channel, expressed as $f \in \{1, 2, 4, 8\}$. Therefore, each PDCCH region may be expressed as $i*f$ ($i=0, 1, 2 \ldots$).

The control channel of the first type may cover at least one aggregation format, and the control channel of the second type may also cover at least one aggregation format. Therefore, difference between the aggregation format of the control channel of the first type and the aggregation format of the control channel of the second type means that the aggregation formats covered by the control channel of the first type are completely or partially different from the aggregation formats covered by the control channel of the second type; and, complete or partial difference of the combination modes of control channel elements detected when the user equipment performs detection in the PDCCH region and the E-PDCCH region includes complete or partial difference of the number of integral control channel elements (that is, an aggregation level of the control channel) and/or the format of the control channel element, such as difference of the size or the structure of the control channel element.

(2) The format of signaling transmitted over the control channel refers to specific contents of the control channel for transmitting the scheduling information. If the format of signaling transmitted over the control channel of the first type is different from the format of signaling transmitted over the control channel of the second type, the specific contents of the control channels detected by the user equipment in the PDCCH region and the E-PDCCH region are different. Specifically, the control channel detected by the user equipment in the PDCCH region and the control channel detected in the E-PDCCH region transmit downlink control information of different downlink control signaling formats (DCI format). The DCI formats specifically may include a first DCI format group, a second DCI format group, a third DCI format group, and so on. The first DCI format group includes format a and format b, and the second DCI format groups include format c and format d.

(3) The search space type refers to a transmission resource range in which the user equipment searches for a downlink subframe, and includes a common search space type and a user-specific search space type. The common search space is used to transmit scheduling indication signaling of common control information (such as a system broadcast message, a paging message, and an random access message), and the user-specific search space is used to transmit scheduling indication signaling of uplink and downlink data transmission of the user equipment. Generally, the common search space includes control channel elements numbered 0 to 15 fixedly, and the beginning of the user-specific search space depends on the user identifier (ID) and the PDCCH aggregation format. If the search space type differs between the control channel of the first type and the control channel of the second type, the search space that covers the control channel detected by the user equipment in the PDCCH region is different from the search space that covers the control channel detected by the user equipment in the E-PDCCH region.

It should be noted that the order between step 101 and step 102 is not definite, and the order shown in FIG. 2 is only a specific example.

As can be seen, in the embodiment of the present invention, the base station carries scheduling information of a user equipment in an R11 system in both the PDCCH region and the E-PDCCH region of a downlink subframe. In this way, the user equipment needs to detect the control channel within the PDCCH region and E-PDCCH region respectively, so that resources of the two regions are available to the user equipment in the R11 system. Moreover, in the embodiment of the present invention, control channels of different types are detected in the PDCCH region and the E-PDCCH region respectively, and therefore, only the control channel of the first type is detected in the PDCCH region, and a control channel of another type is detected in the E-PDCCH region. In this way, compared with the fact that in the system of a non-evolved release, the user equipment needs to detect control channels of all possible types, the method in the embodiment of the present invention does not increase the number of control channel detections.

It should be noted that a base station side may configure control channels of the first type and the second type to be detected by the user equipment. The base station may send configuration information to the user equipment in a predefined or broadcast manner. The configuration information is used to indicate the control channels of the first type and the second type to be detected by the user equipment, and the configuration information may be sent by using a message such as a broadcast message or a high layer signaling notification.

Moreover, the base station may configure that the types of the control channel detected by multiple user equipments in the PDCCH region (or E-PDCCH region) are the same, or the types of the control channel detected by user equipments in the PDCCH region (or E-PDCCH region) are different.

In a specific embodiment, if the aggregation formats differ partly or fully between the control channel of the first type and the control channel of the second type, the aggregation formats covered by the control channel of the first type detected by the user equipment in the PDCCH region are partly or fully different from the aggregation formats covered by the control channel of the second type detected by the user equipment in the E-PDCCH region.

(1) If the aggregation formats of the control channels are fully different:

Assume that there are N aggregation formats of the control channel, that is, $\{f_0, f_1, f_2, f_{N-1}\}$, in the PDCCH region, a control channel may be composed of $f_i$ ($i=0, \ldots, N-1$) CCEs and in the E-PDCCH region, a control channel may be composed of $f_i$ ($i=0, \ldots, N-1$) E-CCEs. Therefore, when performing detection in the PDCCH region, the user equipment detects control channels whose aggregation format is $f_i$ ($0 \leq i \leq N_1$); and when performing detection in the E-PDCCH region, the user equipment detects control channels whose aggregation format is $f_i$ ($N_1 < i \leq N$).

Moreover, in the aggregation formats $f_i$ of the control channels detected by the user equipment, i may be any one or more values from 0 to N, and the i values applied in the detection in the PDCCH region do not intersect the i values applied in the detection in the E-PDCCH region.

For example, Table 1 below shows the control channel of the first type and the control channel of the second type that have fully different aggregation formats, and therefore, the user equipment in the R11 system detects, in the PDCCH region, control channels whose aggregation format is $\{1*CCE, 2*CCE\}$, and the number of detections is N1+N2;

and the user equipment detects, in the E-PDCCH region, control channels whose aggregation format is {4*E-CCE, 8*E-CCE}, and the number of detections is N3+N4. Therefore, the total number of detections performed by the user equipment in the R11 system in the PDCCH region and the E-PDCCH region is N1+N2+N3+N4, and is not more than the number of detections of the control channels of the aggregation formats {2*CCE, 1*CCE, 4*CCE, 8*CCE} in the PDCCH region by a user equipment in a system of a non-evolved release.

TABLE 1

Common and user-specific search space

| Type | Aggregation level | Control channel element | Number of detections |
|---|---|---|---|
| Control channel of first type | 1 | CCE | N1 |
|  | 2 | CCE | N2 |
| Control channel of second type | 4 | E-CCE | N3 |
|  | 8 | E-CCE | N4 |

(2) To further improve flexibility of allocating PDCCH resources, the aggregation formats covered by the control channels detected in the PDCCH region and the E-PDCCH region, that is, the combination mode of the control channel elements, may be partly different. Therefore, the sum of the number of detections of the control channel of the first type in the PDCCH region by the user equipment and the number of detections of the control channel of the second type in the E-PDCCH region is required to be not greater than the preset number of detections.

Specifically, when performing detection in the PDCCH region, the user equipment detects control channels whose aggregation format is $f_i(0 \leq i \leq N_1)$; when performing detection in the E-PDCCH region, the user equipment detects control channels whose aggregation format is $f_i(N_2 \leq i \leq N)$, where $N_2 < N_1$. To avoid increase of the number of detections, assuming that the control channel of the first type is detected for M1 times in the PDCCH region and the control channel of the second type is detected for M2 times in the E-PDCCH region, M1+M2 is not greater than the preset number M of detections, where M may be the number of detections of the control channel in the PDCCH region by a user equipment in a system of a non-evolved release (a user equipment in the R8/9/10 system).

Moreover, in the aggregation formats $f_i$ of the control channel detected by the user equipment, i may be any one or more values from 0 to N, and the i values applied in the detection in the PDCCH region intersect the i values applied in the detection in the E-PDCCH region.

For example, Table 2 below shows the control channel of the first type and the control channel of the second type that have partly different aggregation formats, and therefore, the user equipment in the R11 system detects, in the PDCCH region, control channels whose aggregation format is {1*CCE, 2*CCE}, and the number of detections is X1+X2; and the user equipment detects, in the E-PDCCH region, control channels whose aggregation format is {2*E-CCE, 4*E-CCE}, and the number of detections is X3+X4. Therefore, the total number of detections performed by the user equipment in the R11 system in the PDCCH region and the E-PDCCH region is X3+X4+X1+X2, and, if the sum of the numbers of detections, M1+M2, is not greater than the preset number M of detections, is also not more than the number of detections of the control channels of the aggregation formats {2*CCE, 1*CCE, 4*CCE, 8*CCE} in the PDCCH region by a user equipment in a system of a non-evolved release.

TABLE 2

Common and user-specific search space

| Type | Aggregation level | Control channel element | Number of detections |
|---|---|---|---|
| Control channel of first type | 1 | CCE | X1 |
|  | 2 | CCE | X2 |
| Control channel of second type | 2 | E-CCE | X3 |
|  | 4 | E-CCE | X4 |

Because the E-PDCCH region uses the resources of the original PDSCH region, the available resources are sufficient, a dedicated pilot may be used for demodulation and multi-antenna transmission, and the transmission performance is better than the transmission performance of the PDCCH region. Therefore, the size of the resources of the aggregation formats covered by the control channel of the second type detected by the user equipment in the E-PDCCH region is not smaller than the size of the resources of the aggregation formats covered by the control channel of the first type detected in the PDCCH region, thereby further improving control channel performance and resource utilization. For example, the aggregation formats of the control channel include {1, 2, 4, 8}, and therefore, the user equipment may detect control channels whose aggregation format is {1, 2} in the PDCCH region, the user equipment may detect control channels whose aggregation format is {4, 8} in the E-PDCCH region.

It should be noted that the aggregation format of the control channels detected by the user equipment in the PDCCH region and the E-PDCCH region may be a common configuration of a cell, that is, a base station may configure all user equipments to detect control channels of the same aggregation format in the PDCCH region (or E-PDCCH region), and send configuration information to the user equipments through a predefined manner of the system or a broadcast message.

The base station may also configure each user equipment to detect control channels of different aggregation formats in the PDCCH region (or E-PDCCH region). For example, the base station may configure user equipment 1 to detect control channels of the aggregation formats 1 and 2 in the PDCCH region, and detect control channels of the aggregation formats 4 and 8 in the E-PDCCH region; and, the base station may configure user equipment 2 to detect the control channels of the aggregation format 1 in the PDCCH region, and detect the control channels of the aggregation formats 2, 4, and 8 in the E-PDCCH region.

When configuring the aggregation format of the control channel to be detected by the user equipment, the base station may notify the user equipment of the configuration by using high layer signaling. Specifically, the high layer signaling notification may bind the aggregation format of the control channel to an identifier (ID) of the user equipment. For example, there are S control channel aggregation formats, and a user equipment may be configured to detect the control channel of the $s^{th}$ aggregation format, where s is the identifier of the user equipment modulo S, that is, s=mod (UE_ID, S).

In addition, the configuration information may be sent by the base station to the user equipment through user equipment-specific (UE-specific) signaling or cell-specific signaling.

In another specific embodiment, if the format of signaling transmitted over the control channel of the first type is different from the format of signaling transmitted over the control channel of the second type, the DCI format of downlink control information transmitted over the control channel detected by the user equipment in the PDCCH region is different from the DCI format of downlink control information transmitted over the control channel detected in the E-PDCCH region.

For example, the DCI format of downlink control information transmitted over the control channel of the first type detected by the user equipment in the PDCCH region is an uplink scheduling UL_grant control signaling format, but the DCI format of downlink control information transmitted over the control channel of the second type detected in the E-PDCCH region is a downlink scheduling DL_grant control signaling format; or, the DCI format of downlink control information transmitted over the control channel of the first type detected by the user equipment in the PDCCH region is a downlink scheduling DL_grant control signaling format, but the DCI format of downlink control information transmitted over the control channel of the second type detected by the user equipment in the E-PDCCH region is an uplink scheduling UL_grant control signaling format.

In addition, if the two types of DCI formats are equal in size, the DCI formats of downlink control information transmitted over the control channel of the first type detected in the PDCCH region include one of the two types of the DCI formats, and the DCI formats of downlink control information transmitted over the control channel of the second type detected in the E-PDCCH region include the other type of the DCI formats. In this way, it is ensured that the downlink control information transmitted over the control channel of the first type includes multiple control signaling formats DCI format of different sizes, and that the downlink control information transmitted over the control channel of the second type includes multiple control signaling formats DCI format of different sizes.

Specifically, assume that there are M formats of signaling transmitted over the control channel, that is, $\{g_0, g_1, g_2, \ldots, g_{N-1}\}$. In the PDCCH region, a control channel may be composed of $f_1$ $(g_i)$ CCEs; and, in the E-PDCCH region, a control channel may be composed of $f_2$ $(g_i)$ E-CCEs. Therefore, the format of signaling transmitted over the control channel detected by the user equipment in the PDCCH region is different from the format of signaling transmitted over the control channel detected in the E-PDCCH region. For example, the control channel detected by the user equipment in the PDCCH region transmits information of a $f_1$ $(g_i)$ format, and the control channel detected in the E-PDCCH region transmits information of a $f_2$ $(g_i)$ format.

It should be noted that the format of signaling transmitted over the control channels of the first type and the second type detected in the PDCCH region and the E-PDCCH region may be a common configuration of a cell, that is, the control signaling formats covered by the control channel of the first type and the control signaling formats covered by the control channel of the second type may be a common configuration of the cell. In this case, for all user equipments in the cell, the control signaling formats covered by the control channel of the first type are the same, and the control signaling formats covered by the control channel of the second type are also the same. Such a configuration may be predefined, or the configuration information is sent to the user equipment through a system broadcast message.

The base station may also configure the control signaling formats covered by the control channel detected by each user equipment in the E-PDCCH region (or PDCCH region) to be different. For example, user equipment 1 detects control channels that cover DCI format 1 and DCI format 1A in the PDCCH region, and detects control channels that cover DCI format 2C and DCI format 2D in the E-PDCCH region; and, user equipment 2 detects control channels that cover DCI format 3 and DCI format 3A in the PDCCH region, and detects control channels that cover DCI format 2B in the E-PDCCH region.

In addition, the configuration information may be sent by the base station to the user equipment through user equipment-specific (UE-specific) signaling or cell-specific signaling.

In another specific embodiment, if the search space type differs between the control channel of the first type and the control channel of the second type, the search space corresponding to the control channel detected by the user equipment in the PDCCH region is different from the search space corresponding to the control channel detected by the user equipment in the E-PDCCH region. Specifically, the control channel of the first type detected by the user equipment in the PDCCH region may be a control channel in the common search space, and the control channel of the second type detected in the E-PDCCH region may be a control channel in the user-specific search space of the user equipment.

Figure 6:
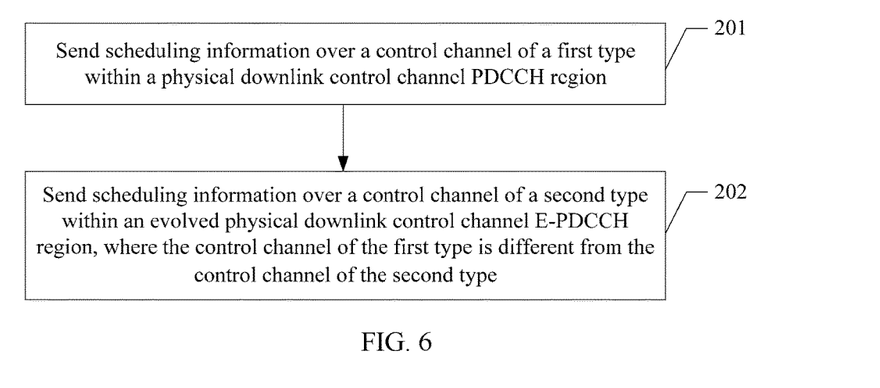
FIG. 6 is a flowchart of a method for sending a control channel according to an embodiment of the present invention.

An embodiment of the present invention provides a method for sending a control channel, applied to control channel sending performed by a base station when the base station schedules a user equipment. The method in the embodiment of the present invention is performed by the base station. As shown in FIG. 6, the method includes the following steps:

Step 201: Send scheduling information over a control channel of a first type within a physical downlink control channel (PDCCH) region.

Step 202: Send scheduling information over a control channel of a second type within an evolved physical downlink control channel (E-PDCCH) region.

At least one of attributes varies between the control channel of the first type and the control channel of the second type. The multiple attributes include: an aggregation format of the control channel, a format of signaling transmitted over the control channel, a search space type of the control channel, and so on.

If the aggregation format of the control channel of the first type is different from the aggregation format of the control channel of the second type, both the control channel of the first type and the control channel of the second type may cover at least one aggregation format of control channels. Therefore, the base station sends, in the PDCCH region and in the E-PDCCH region, user equipment scheduling information by using control channels of completely or partially different control channel element combinations, where the different control channel element combinations include completely or partially different numbers of integral control channel elements (aggregation level) and/or formats (such as sizes) of the control channel elements; and the size of the resources of the aggregation formats covered by the control channel of the first type transmitted over the base station in the E-PDCCH region is not smaller than the size of the resources of the aggregation formats covered by the control channel of the second type sent in the PDCCH region.

If the format of signaling transmitted over the control channel of the first type is different from the format of signaling transmitted over the control channel of the second type, that is, if the format of signaling for the control channel of the first type to transmit scheduling information is different from the format of signaling for the control channel of the second type to transmit scheduling information, the base station sends, in the PDCCH region and the E-PDCCH region, user equipment scheduling information by using control channels of different DCI formats. Specifically, the DCI format may be an uplink scheduling UL_grant control signaling format, or a downlink scheduling —grant control signaling format, or the like. For example, the DCI format of downlink control information transmitted over the control channel of the first type in the PDCCH region is an uplink scheduling UL_grant control signaling format, and the DCI format of downlink control information transmitted over the control channel of the second type in the E-PDCCH region is a downlink scheduling DL_grant control signaling format; or, the DCI format of downlink control information transmitted over the control channel of the first type in the PDCCH region is a downlink scheduling DL_grant control signaling format, and the DCI format of downlink control information transmitted over the control channel of the second type in the E-PDCCH region is an uplink scheduling UL_grant control signaling format.

If the search space type differs between the control channel of the first type and the control channel of the second type, the base station maps the control channels in the PDCCH region and the control channels in the E-PDCCH region to different search spaces, for example, to a common search space and a user-specific search space, or the like.

It should be noted that, if the two types of DCI formats are equal in size at the time of sending the scheduling information, the base station transmits scheduling information of one type of DCI formats over the control channel of the first type in the PDCCH region, and transmits scheduling information of the other type of DCI formats over the control channel of the second type in the E-PDCCH region.

Understandably, when sending the user equipment scheduling information, the base station needs to send a downlink subframe that includes the PDCCH region and the E-PDCCH region to the user equipment, but the user equipment does not know compositions of the PDCCH region and the E-PDCCH region of the user equipment in the downlink frame, and needs to perform blind detection. The method of the blind detection has been described in the embodiment shown in FIG. 1, and is not repeated here any further.

As can be seen, in the embodiment of the present invention, the base station carries the scheduling information of the user equipment in the R11 system in both the PDCCH region and the E-PDCCH region, and the types of the sent control channels in both the PDCCH region and the E-PDCCH region differs. In this way, resources of two regions are available to the user equipment in the R11 system, and the user equipment needs to detect control channels of different types within the PDCCH region and the E-PDCCH region respectively. Therefore, the user equipment detects only the control channel of the first type in the PDCCH region, and detects the control channel of the second type in the E-PDCCH region. In this way, compared with the fact that in the system of a non-evolved release, the user equipment needs to detect control channels of all possible types, the number of control channel detections does not increase.

In a specific embodiment, the base station may configure the types of control channels to be detected by the user equipment. Specifically, the base station may send configuration information to the user equipment, where the configuration information is used to instruct the user equipment to detect the control channel of the first type in the physical downlink control channel (PDCCH) region, and detect the control channel of the second type in the evolved physical downlink control channel (E-PDCCH) region. In addition, the base station may send the configuration information to the user equipment through user equipment-specific UE-specific signaling or cell-specific cell-specific signaling.

Figure 7:
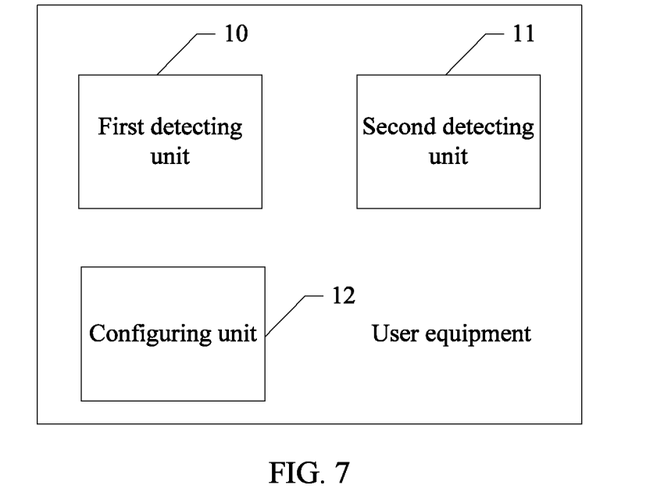
FIG. 7 is a schematic structural diagram of a user equipment according to an embodiment of the present invention.

An embodiment of the present invention provides a user equipment. The user equipment is a user equipment of an R11 system, and its structural diagram is shown in FIG. 7. The user equipment includes:

a first detecting unit 10, configured to detect a control channel of a first type within a physical downlink control channel (PDCCH region); and a second detecting unit 11, configured to detect a control channel of a second type within an evolved physical downlink control channel (E-PDCCH) region, where the control channel of the first type is different from the control channel of the second type. Specifically, at least one of multiple attributes varies between the control channel of the first type detected by the first detecting unit 10 and the control channel of the second type detected by the second detecting unit 11. The multiple attributes include: an aggregation format of the control channel, a format of signaling transmitted over the control channel, a search space type of the control channel, and so on.

Understandably, if the aggregation formats differ between the control channel of the first type and the control channel of the second type, the aggregation formats covered by the control channels detected by the first detecting unit 10 in the PDCCH region are fully or partly different from the aggregation formats covered by the control channels detected by the second detecting unit 11 in the E-PDCCH region, which includes that the aggregation levels of the control channels and/or the formats of the control channel elements are completely or partially different. When the aggregation formats covered by the control channel of the first type detected are partly different from the aggregation formats covered by the control channel of the second type detected, the sum of the numbers of detections of the control channels respectively by the first detecting unit 10 and the second detecting unit 11 is not greater than the preset number of detections. Moreover, the size of the resources of the aggregation formats covered by the control channel of the second type detected by the second detecting unit 11 in the E-PDCCH region is not smaller than the size of the resources of the aggregation formats covered by the control channel of the first type detected by the first detecting unit 10 in the PDCCH region.

If the format of signaling transmitted over the control channel of the first type is different from the format of signaling transmitted over the control channel of the second type, the control signaling format DCI format of the downlink control information transmitted over the control channel of the first type detected by the first detecting unit 10 is different from the DCI format of the downlink control information transmitted over the control channel of the second type detected by the second detecting unit 11. Specifically, the DCI format may be an uplink scheduling UL_grant control signaling format, or a downlink scheduling DL_grant control signaling format, or the like.

If the search space type differs between the control channel of the first type and the control channel of the second type, the first detecting unit 10 may detect the control channel of the first type in the PDCCH region in a common search space, and the second detecting unit 11 may detect the control channel of the second type in the E-PDCCH region in a user-specific search space of the user equipment.

It should be noted that the detection performed by the first detecting unit 10 and the detection performed by the second detecting unit 11 do not occur in definite order, and may occur concurrently or sequentially.

In the user equipment in the embodiment of the present invention, the first detecting unit 10 and the second detecting unit 11 need to detect control channels in the PDCCH region and the E-PDCCH region respectively, so that resources of the two regions are available to the user equipment in the R11 system. Because the control channel of the first type is different from the control channel of the second type, the user equipment detects control channels of only one type in the PDCCH region, and detects control channels of the other type in the E-PDCCH region. In this way, compared with the fact that in the system of a non-evolved release, the user equipment needs to detect control channels of all possible types, the number of control channel detections does not increase.

In a specific embodiment, the user equipment in the embodiment of the present invention may further include a configuring unit 12, configured to receive configuration information sent by a base station, where the configuration information is used to indicate the control channels of the first type and the second type.

In addition, the configuration information may be sent by the base station to the user equipment through user equipment-specific (UE-specific) signaling or cell-specific signaling.

Figure 8:
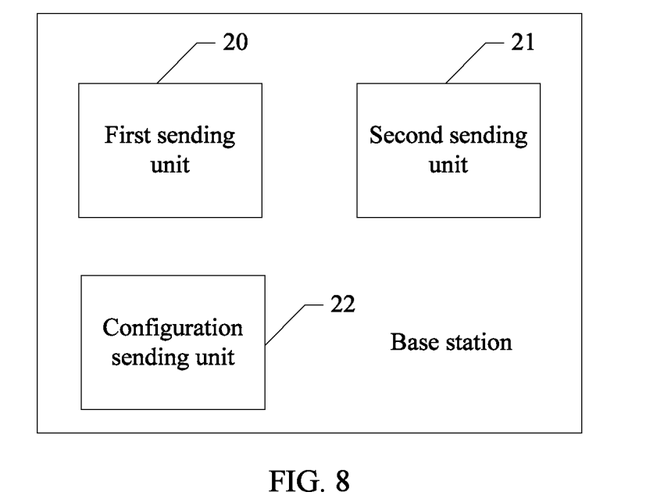
FIG. 8 is a schematic structural diagram of a base station according to an embodiment of the present invention.

An embodiment of the present invention provides a base station, a structural diagram is shown in FIG. 8. The base station includes:

a first sending unit 20, configured to send scheduling information over a control channel of a first type within a physical downlink control channel (PDCCH) region; and a second sending unit 21, configured to send scheduling information over a control channel of a second type within an evolved physical downlink control channel (E-PDCCH) region.

At least one of multiple attributes varies between the control channel of the first type that carries the scheduling information sent by the first sending unit 20 and the control channel of the second type that carries the scheduling information sent by the second sending unit 21. The multiple attributes include: an aggregation format of the control channel, a format of signaling transmitted over the control channel, a search space type of the control channel.

If the aggregation formats differ between the control channel of the first type and the control channel of the second type, the control channel element combination mode used by the first sending unit 20 to send the user equipment scheduling information in the PDCCH region is different from the control channel element combination mode used by the second sending unit 21 to send the user equipment scheduling information in the E-PDCCH region, where the difference includes difference of the aggregation levels of the control channel elements and/or the formats of the control channel elements.

If the format of signaling transmitted over the control channel of the first type is different from the format of signaling transmitted over the control channel of the second type, the control signaling format used by the first sending unit 20 to send the user equipment scheduling information in the PDCCH region is different from the control signaling format used by the second sending unit 21 to send the user equipment scheduling information in the E-PDCCH region, where the DCI format is specifically an uplink scheduling UL_grant control signaling format or a downlink scheduling DL_grant control signaling format, or the like. In addition, if the two types of DCI formats are equal in size, the first sending unit 20 and the second sending unit 21 transmit downlink control information of one type of DCI formats over the control channel of the first type in the PDCCH region, and transmit downlink control information of the other type of DCI formats over the control channel of the second type in the E-PDCCH region, respectively.

If the search space type differs between the control channel of the first type and the control channel of the second type, the first sending unit 20 and the second sending unit 21 may map the PDCCH region and the E-PDCCH region to different search spaces, for example, to a common search space or a user-specific search space, or the like.

As can be seen, in the base station in the embodiment of the present invention, the first sending unit 20 and the second sending unit 21 send the scheduling information of the user equipment in the R11 system in the PDCCH region and the E-PDCCH region respectively, and the type of the used control channel differs. In this way, resources of two regions are available to the user equipment in the R11 system, and the user equipment needs to detect control channels of different types within the PDCCH region and E-PDCCH region respectively. Therefore, the user equipment detects control channels of only one type in the PDCCH region, and detects control channels of the other type in the E-PDCCH region. In this way, compared with the fact that in the system of a non-evolved release, the user equipment needs to detect control channels of all possible types, the number of control channel detections performed by the user equipment does not increase.

In a specific embodiment, the base station in this embodiment may further include a configuration sending unit 22, configured to send configuration information to the user equipment, where the configuration information is used to instruct the user equipment to detect the control channel of the first type in the physical downlink control channel (PDCCH) region and detect the control channel of the second type in the evolved physical downlink control channel E-PDCCH region.

Moreover, the configuration information may be sent by the configuration sending unit 22 of the base station to the user equipment through user equipment-specific (UE-specific) signaling or cell-specific signaling.

An embodiment of the present invention provides a system for receiving and sending a control channel, including a base station and a user equipment. The base station is configured to send a downlink subframe to the user equipment, and its structure is shown in FIG. 8; and the user equipment is configured to perform blind detection when receiving a downlink subframe, and its structure is shown in FIG. 7.

The methods performed by the base station and the user equipment may correspond to the embodiments shown in FIG. 6 and FIG. 2 respectively, and are not repeated here any further.

A person of ordinary skill in the art may understand that all or a part of the steps of the methods in the foregoing embodiments may be implemented by a program instructing relevant hardware. The program may be stored in a computer readable storage medium, and the storage medium may include a read-only memory (ROM), a random access memory (RAM), a magnetic disk, or an optical disk or the like.

Methods and apparatuses for receiving and sending a control channel that are provided in the embodiments of the present invention are introduced in detail in the foregoing. In this specification, specific examples are used for illustrating principles and implementation manners of the present invention. The foregoing descriptions of the embodiments are merely used to help understand the methods and core ideas of the present invention. Meanwhile, a person of ordinary skill in the art may make various modifications to the specific implementation manners and application scopes according to the idea of the present invention. In conclusion, the content of the specification shall not be construed as a limitation to the present invention.

What is claimed is:

1. A method, comprising:
    sending, only in a common search space, by a network device to a terminal device, scheduling information over a first type control channel within a physical downlink control channel (PDCCH) region in a downlink subframe in a carrier; and
    sending only in a search space specific to the terminal device, by the network device to the terminal device, scheduling information over a second type control channel within an evolved physical downlink control channel (E-PDCCH) region in the downlink subframe containing the PDCCH region in the carrier,
    wherein in the subframe, the network device does not send any PDCCH in a search space specific to the terminal device within the PDCCH region, and does not send any E-PDCCH in a common search space within the E-PDCCH region.

2. The method according to claim 1, wherein
    at least one aggregation format of the first type control channel is different from aggregation formats of the second type control channel.

3. The method according to claim 2, wherein
    at least one aggregation level and/or at least one format of control channel elements differs between the first type control channel and the second type control channel.

4. The method according to claim 3, wherein a size of resources of the aggregation levels of the second type control channel is not smaller than a size of resources of the aggregation levels of the first type control channel.

5. The method according to claim 1, wherein
    at least one downlink control information format (DCI format) of the first type control channel is different from DCI formats of the second type control channel.

6. The method according to claim 5, wherein
    a DCI format of the first type control channel is an uplink scheduling (UL_grant) control signaling format, and a DCI format of the second type control channel is a downlink scheduling (DL_grant) control signaling format; or
    a DCI format of the first type control channel is a DL_grant control signaling format, a DCI format of the second type control channel is an UL_grant control signaling format.

7. The method according to claim 6, wherein:
    a size of the DCI format of the first type control channel is the same as a size of the DCI format of the second type control channel.

8. The method according to claim 1, further comprising:
    transmitting, by the network device, through signaling specific to the terminal device, configuration information indicating the control channel of the second type.

9. A non-transitory computer-readable storage medium storing instructions that, when executed by a processor, cause the processor to carry out the following:
    sending, only in a common search space, scheduling information for a terminal device over a first type control channel within a physical downlink control channel (PDCCH) region in a downlink subframe in a carrier; and
    sending, only in a search space specific to the terminal device, scheduling information for the terminal device over a second type control channel within an evolved physical downlink control channel (E-PDCCH) region in the downlink subframe containing the PDCCH region in the carrier,
    wherein in the subframe, no PDCCH is sent for the terminal device in a search space specific to the terminal device within the PDCCH region, or no E-PDCCH is sent for the terminal device in a common search space within the E-PDCCH region.

10. The non-transitory computer-readable storage medium according to claim 9, wherein
    at least one aggregation format of the first type control channel is different from aggregation formats of the second type control channel.

11. The non-transitory computer-readable storage medium according to claim 10, wherein
    at least one aggregation level and/or at least one format of control channel elements differs between the first type control channel and the second type control channel.

12. The non-transitory computer-readable storage medium according to claim 11, wherein a size of resources of the aggregation levels of the second type control channel is not smaller than a size of resources of the aggregation levels of the first type control channel.

13. The non-transitory computer-readable storage medium according to claim 9, wherein
    at least one downlink control information format (DCI format) of the first type control channel is different from DCI formats of the second type control channel.

14. The non-transitory computer-readable storage medium according to claim 13, wherein
    a DCI format of the first type control channel is an uplink scheduling (UL_grant) control signaling format, and a DCI format of the second type control channel is a downlink scheduling (DL_grant) control signaling format; or
    a DCI format of the first type control channel is a DL_grant control signaling format, and a DCI format of the second type control channel is an UL_grant control signaling format.

15. The non-transitory computer-readable storage medium according to claim 14, wherein a size of the DCI format of the first type control channel is the same as a size of the DCI format of the second type control channel.

16. An apparatus, comprising:
    a non-transitory computer readable storage medium including executable instructions; and
    a processor;
    wherein the executable instructions, when executed by the processor, cause the processor to:
    send, only in a common search space, scheduling information for the terminal device over a first type control channel within a physical downlink control channel (PDCCH) region in a downlink subframe in a carrier; and
    send, only in a search space specific to the terminal device, scheduling information for the terminal device over a second type control channel within an evolved physical downlink control channel (E-PDCCH) region in the downlink subframe containing the PDCCH region in the carrier, wherein in the subframe, the apparatus does not send any PDCCH in a search space specific to the terminal device within the PDCCH region, and does not send any E-PDCCH in a common search space within the E-PDCCH region.

17. The apparatus according to claim 16, wherein the executable instructions, when executed by the processor, cause the processor to:

transmitting, through signaling specific to the terminal device, configuration information indicating the second type control channel.

18. The apparatus according to claim 16, wherein at least one aggregation format of the first type control channel is different from aggregation formats of the second type control channel.

19. The apparatus according to claim 16, wherein at least one downlink control information format (DCI format) of the first type control channel is different from DCI formats of the second type control channel.

20. The apparatus according to claim 19, wherein a DCI format of the first type control channel is an uplink scheduling (UL_grant) control signaling format, and a DCI format of the second type control channel is a downlink scheduling (DL_grant) control signaling format; or a DCI format of the first type control channel is a DL_grant control signaling format, and a DCI format of the second type control channel is an UL_grant control signaling format.

21. The apparatus according to claim 20, wherein:

a size of the DCI format of the first type control channel is the same as a size of the DCI format of the second type control channel.

* * * * *